United States Patent
Baughman et al.

(10) Patent No.: US 12,352,627 B2
(45) Date of Patent: Jul. 8, 2025

(54) METHOD AND DEVICE FOR DEPLOYING AND USING AN IMAGE SIMILARITY METRIC WITH DEEP LEARNING

(71) Applicant: BASF COATINGS GMBH, Münster (DE)

(72) Inventors: Donald R Baughman, Whitehouse, OH (US); Matthew Leopold, Whitehouse, OH (US); Guido Bischoff, Muenster (DE); Stuart K Scott, Florham Park, NJ (US); Jessica J Mcguckin, Whitehouse, OH (US)

(73) Assignee: BASF COATINGS GMBH, Muenster (DE)

( * ) Notice: Subject to any disclaimer, the term of this patent is extended or adjusted under 35 U.S.C. 154(b) by 387 days.

(21) Appl. No.: 17/905,062

(22) PCT Filed: Feb. 26, 2021

(86) PCT No.: PCT/EP2021/054820
§ 371 (c)(1),
(2) Date: Aug. 25, 2022

(87) PCT Pub. No.: WO2021/170796
PCT Pub. Date: Sep. 2, 2021

(65) Prior Publication Data
US 2023/0145070 A1     May 11, 2023

(30) Foreign Application Priority Data
Feb. 26, 2020    (EP) .................................... 20159532

(51) Int. Cl.
*G01J 3/46*      (2006.01)
*G06T 7/11*      (2017.01)
(Continued)

(52) U.S. Cl.
CPC ............... *G01J 3/463* (2013.01); *G06T 7/11* (2017.01); *G06T 7/90* (2017.01); *G06V 10/242* (2022.01);
(Continued)

(58) Field of Classification Search
CPC ....... G01J 3/463; G01J 2003/466; G06T 7/11; G06T 7/90; G06T 2207/10024;
(Continued)

(56) References Cited

U.S. PATENT DOCUMENTS

| | | | |
|---|---|---|---|
| 2007/0172113 A1* | 7/2007 | Sai | ......................... G01N 21/25 |
| | | | 382/162 |
| 2014/0242271 A1* | 8/2014 | Prakash | .................... B60S 5/00 |
| | | | 356/73 |

(Continued)

OTHER PUBLICATIONS

Wright, "BASF Coatings Uses Artificial Intelligence For Color Matching", CoatingsWorld, Oct. 30, 2008, https://www.coatingsworld.com/contents/view_breaking-news/2008-10-30/basf-coatings-uses-artificial-intelligence-for-col/.

(Continued)

*Primary Examiner* — Jianxun Yang
(74) *Attorney, Agent, or Firm* — Armstrong Teasdale LLP (57) ABSTRACT

Disclosed herein is a method and a device that can measure an unknown target coating; can search, based on the measured data of the target coating, a database for one or more best matching coating formulas, i.e. one or more preliminary matching formulas, within the database; and that can refine the search using an image similarity metric between images of the one or more best matching coating formulas on the one side and images of the target coating on the other side, using deep learning techniques.

18 Claims, 5 Drawing Sheets

(51) Int. Cl.
  *G06T 7/90*     (2017.01)
  *G06V 10/24*    (2022.01)
  *G06V 10/74*    (2022.01)

(52) U.S. Cl.
  CPC ...... *G06V 10/761* (2022.01); *G01J 2003/466* (2013.01); *G06T 2207/10024* (2013.01); *G06T 2207/20081* (2013.01); *G06T 2207/20084* (2013.01)

(58) Field of Classification Search
  CPC . G06T 2207/20081; G06T 2207/20084; G06T 2207/30156; G06V 10/242; G06V 10/761
  See application file for complete search history.

(56) References Cited

U.S. PATENT DOCUMENTS

2019/0172228 A1   6/2019  Steenhoek et al.
2021/0142055 A1*  5/2021  Broggi ............. G08B 13/19656

OTHER PUBLICATIONS

Meng et al., "Deep Triplet Ranking Networks for One-Shot Recognition", arXiv, Apr. 19, 2018, pp. 1-9, abs/1804.07275(1).
DAS, "Image Similarity Using Triplet Loss," Towards Data Science, Jul. 16, 2019, https:///towardsdatascience.com/image-similarity-using-triplet-loss-3744c0f67973.
International Search Report and Written Opinion for PCT/EP2021/054820 issued on May 12, 2021, 11 pages.

\* cited by examiner

Figure 4

METHOD AND DEVICE FOR DEPLOYING AND USING AN IMAGE SIMILARITY METRIC WITH DEEP LEARNING

CROSS-REFERENCE TO RELATED APPLICATIONS

This application is a U.S. National Phase Application of International Patent Application No. PCT/EP2021/054820, filed Feb. 26, 2021, which claims priority to European Patent Application No. 20159532.9, filed Feb. 26, 2020, each of which is hereby incorporated by reference herein.

FIELD OF THE INVENTION

The present invention refers to a computer-implemented method and a device for deploying and using an image similarity metric between two HDR effect coating images with deep learning.

BACKGROUND OF THE INVENTION

Today, for the color search and retrieval process additional features like e. g. coarseness, sparkle area, sparkle intensity, sparkle grade and/or sparkle color variation/distribution are used as side condition, beside color information, to find an optimal solution for a given target color/target coating. These additional features are metrices for different visual properties of the texture appearance of a color.

These additional features are typically derived from image raw data of the target coating captured by today's photospectrometer instruments like e. g. Xrite MA-T6®, MA-T12® or Byk mac i®. The image raw data are processed by image processing algorithms. As output of those algorithms texture features, i. e. texture values are gained which are supposed to represent optical properties of the texture of the target coating. Those texture values are classified according to known industry standards.

Due to the nature of complex coating mixtures, it is sometimes difficult to formulate, identify, and/or search for acceptable matching formulations and/or pigmentations. Ideally, a human being could view a complex coating mixture and determine the appropriate pigments within the coating mixture. However, in reality the pigments in a coating mixture may not be readily available in a set of toners of a paint system that is to be utilized to make a matching coating. Thus, a person skilled in color matching has to make a determination as to whether the paint system contains appropriate offsets and, if so, must determine additional changes which need to be made to accommodate the offsets given that they are not identical matches to the original pigmentation.

Reflectance (spectral data) and texture (image data) of a color coating is measured from several geometries. Colorimetric data is derived from the spectral data and texture features are derived from the image data. Known techniques using cameras and/or spectrometers, optionally combined with microscopic evaluation of a target coating, are generally not appropriately defined to efficiently address new effect pigmentations or complex mixtures and are largely focused on an individual evaluation of the target coating, i. e. on an analysis from case to case which is a very time consuming process as each new unknown target coating requires to pass through all analyse steps. Thus, such time consuming process may not satisfactorily address application issues which require a time efficient analysis of the target coating combined with a provision of a matching formula.

There are further strategies using painted or virtual samples representing various textures, and then comparing those to the unknown target coating. However, such techniques often require substantial user intervention and, thus, are subjective, which may produce inconsistent results.

Color measurements of already existing colors with their respective formulas are stored in a formulation database. A color search/retrieval process is often initiated by a search in such a database.

The formulas whose measurement is close in terms of color are then chosen as preliminary matching results/formulas and displayed to the user in a specific order which is given by a ranking function using colorimetric data and texture feature data as input. The aim of this ranking function is that the best formulation regarding the total appearance is at the top of the result list.

Spectral data alone provides acceptable match quality from multiple viewing angles, but often have unacceptable total appearance due to texture and sparkle deviations. Prior art used a spectrophotometer with black and white image capability to calculate texture values Gdiff (diffuse graininess or coarseness), Si (sparkle intensity), and Sa (sparkle area), as introduced by the company Byk-Gardner. This was a good first step towards characterizing the texture of a target coating but had limited abilities to identify the total appearance of the target coating. More recently, color images are available on spectrophotometers by X-Rite. The patent "PIGMENT IDENTIFICATION OF COMPLEX COATING MIXTURES WITH SPARKLE COLOR" (US 2017/0200288 A1) improved the technology by adding hue analysis to determine sparkle color distribution. This advancement improves color retrieval performance, but only utilizes a limited feature set from an image versus all embedded image and effect features.

SUMMARY OF THE INVENTION

It would be desirable to have a method and a device that can measure an unknown target coating, can search, based on the measured data of the target coating, a database for one or more best matching coating formulas. i.e. one or more preliminary matching formulas, within the database and that can refine the search by deploying and using an image similarity metric between images of the one or more best matching coating formulas on the one side and images of the target coating on the other side, using deep learning techniques. However, as to now, known systems are only able to use known (i.e. measurable) features of a target coating, such as spectral features and texture features, but generally cannot assist in taking into account hidden features necessary for matching the unknown target coating.

The above-mentioned objects are solved by the method and the device with the features of the respective independent claims. Further embodiments are presented by the following description and the respective dependent claims.

The present disclosure proposes a computer-implemented method to improve the color match acceptance rate of effect coatings for search/retrieval applications using a formulation database with spectral and HDR image sets.

The present disclosure refers to a computer-implemented method, the method comprising at least the following steps:
a) obtaining, using at least one measuring device, for each of at least one measurement geometry color values, digital images and optionally texture values of at least one training target coating, b) providing a database which comprises formulas for coating compositions and, for each of the at least one measurement geometry, interrelated color values (spectral data), and interrelated digital images (e.g. HDR images), and optionally interrelated texture values, c) retrieving, using a processor, from the database, for each training target coating, a list of a plurality of preliminary matching formulas based on the color values and optionally on the texture values obtained for the respective training target coating, d) dividing the list of the plurality of preliminary matching formulas into two sublists using visual inspection of the digital images of the at least one training target coating and the digital images interrelated with the preliminary matching formulas and retrieved from the database, wherein a first sublist comprises visually good matching formulas of the plurality of preliminary matching formulas and a second sublist comprises visually bad matching formulas of the plurality of preliminary matching formulas, e) creating, using the processor, for each training target coating, a plurality of triplets, each triplet comprising a digital image of the respective training target coating for one of the at least one measurement geometry, a digital image retrieved from the database for the one of the at least one measurement geometry which is interrelated with a visually good matching formula of the first sublist and a digital image retrieved from the database for the one of the at least one measurement geometry which is interrelated with a visually bad matching formula of the second sublist, f) training a convolutional neural network by providing the created triplets, one triplet after the other, to the convolutional neural network as a respective input, and optimizing a n-dimensional cost function, the cost function defining a similarity distance to the at least one training target coating as image similarity metric, such that the cost function is minimized for the respective visually good matching formula and maximized for the respective visually bad matching formula, and g) making the trained neural network available in the processor for ranking a digital image of a coating composition with respect to a digital image of a target coating.

The terms "formula" and "formulation" are used synonymously herein. The wording "in operative conjunction" means that the respective components are in communication with each other in such a way that the respective components can exchange data among each other. The terms "associated with" and "interrelated with" are used synonymously. Both terms indicate a togetherness of the components which are associated/interrelated with each other.

The color values (spectral data) are obtained, using the at least one measuring device, by analysing spectral curves of the at least one coating, e.g. the at least one training target coating, the spectral curves being measured at different measurement geometries with respect to a surface of the respective coating, e.g. the training target coating which is applied onto a surface of a sample substrate. Generally, a spectral measurement geometry is defined by an illumination direction/angle and an observation direction/angle. Typical spectral measurement geometries are a fixed illumination angle at 45° measured relative to the surface normal of the coating and viewing angles of −15°, 15°, 25°, 45°, 75°, 110°, each measured relative to the specular angle, i. e. the specular direction, the specular direction being defined as the outgoing direction that makes the same angle with the normal of the coating surface as the incoming direction of the respective light ray.

The images and/or the texture values are obtained by capturing, using an image capturing device, multiple digital images, particularly HDR color images, each obtained at a different measurement geometry with respect to a surface of the respective coating, e.g. the respective training target coating. Typical image-based texture measurement geometries are a fixed position for the image capturing device, i. e. a camera, at 15° to the nominal (i.e. to the normal) of the surface of the training target coating. The illumination angles are chosen as r15as-15, r15as15, r15as-45, r15as45, r15as80 and semi-diffuse as defined from X-Rite MAT6®. "Semi-diffuse" means here "as diffuse as possible" with respect to the measuring device and its spatial dimensions. Regarding the geometric designations the positions of the at least one measuring device, e. g. the camera, and of the illumination are reversed. That means that the specular angle is here defined by the fixed position of the camera. Specifically, this means: the designation "r15 as −15", for example, denotes "reverse" with "r", with "15" the fixed position of the camera, namely at an angle of 15° to the nominal (i.e. the normal) of the surface of the training target coating, with "as" "aspecular" and with "−15" the illumination angle measured relative to the specular angle.

The texture values/parameters are particularly sparkle grade SG, sparkle color variation CV and coarseness C or graininess G, sparkle intensity Si and sparkle area Sa of the target coating.

The at least one measuring device may be chosen as a photospectrometer like e. g. Xrite MA-T6®, Xrite MA-T12® or Byk mac i®. Such photospectrometer may also be combined with further suitable devices such as a microscope in order to gain still more image data, like e. g. microscope images.

The database is a formulation database which comprises formulas for coatings compositions and interrelated colorimetric data. The interrelated colorimetric data comprise, for each formula, spectral data, i. e. color values, digital images and optionally texture values of a sample coating (applied to a surface of a sample substrate) based on the respective formula.

The proposed method provides a model with a higher learning capability than models based on hand-crafted features. The method determines an effective image similarity metric which allows to efficiently find images in a search-by-example process that are similar to a target image. The resulting image similarity metric is supposed to correlate with human perception. The method enables to learn fine-grained image similarity with a deep learning model.

The preliminary matching formulas are chosen among the plurality of formulas of the database based on a first matching metric. The first matching metric is defined/calculated by a color difference metric between target coating (e.g. training target coating) and respective sample coating for all or at least some of the above mentioned spectral measurement geometries, e. g. CIE dE*, and, optionally supplementary by at least one texture difference metric, e. g. by at least one of the texture differences dSi, dSa, dG as defined by Byk-Gardner ["Beurteilung von Effektlackierungen, Den Gesamtfarbeindruck objektiv messen", Byk-Gardner GmbH]. The color difference metric and the at least one texture difference metric can be summed up, optionally by a weighted sum. The color difference metric can be described by: CIE $dE^* = \sqrt{dL^{*2} + da^{*2} + db^{*2}}$ with the three color values: L* for the lightness from black (0) to white (100), a* from green (−) to red (+), and b* from blue (−) to yellow (+). Thus, the formulas whose measurement is close in terms of color and optionally also texture are chosen as preliminary matching formulas and displayed to a user on a list in a specific order which is given by a ranking function using colorimetric data and optionally texture feature data as input. The ranking function is chosen such that the best formulation regarding spectral values and optionally texture values is at the top of the list.

Further, the database comprises multiple digital images, particularly HDR color images, each obtained at a different measurement geometry with respect to a surface of the respective coating corresponding to a respective formula.

The wording "to be in communication with" indicates that there is a communicative connection between the respective components.

After retrieving, for each training target coating, from the formulation database the list of the plurality of preliminary matching formulas based on the color values and optionally also the texture values obtained for the respective training target coating, the list of the plurality of preliminary matching formulas for the respective training target coating is divided into two sublists using visual inspection of the digital images of the respective training target coating and the digital images interrelated with the preliminary matching formulas and retrieved from the database, wherein a first sublist comprises visually good matching formulas (i.e. the interrelated digital images are visually close to the respective digital images of the training target coating) of the plurality of preliminary matching formulas and a second sublist comprises visually bad matching formulas (i.e. the interrelated digital images are visually less close to the respective digital images of the training target coating) of the plurality of preliminary matching formulas.

According to one aspect, 500 to 1000, particularly 1000 different training target coatings are chosen and, for each training target coating, a number N of preliminary matching formulas is selected, N being an integer, particularly a natural number. That means that the convolutional neural network (CNN) is trained with a training target image set of about 500 to 1000 panels. For each training target image a list of a plurality N of preliminary matching formulas is retrieved from the formulation database. The list comprises, for example, 20 preliminary matching formulas, i.e. N=20. Generally, those 20 preliminary matching formulas are the twenty best matching formulas that have an acceptable match and similar pigmentation to the respective target image of the training target coating. The plurality of preliminary matching formulas may be chosen such that for each preliminary matching formula a color based distance, such as dE, and optionally a texture based distance, such as dS, dG, dSa, dSi, or a sum of color and texture based distances, such as Z(dE, dS, dG, dSa, dSi), to the respective training target coating is smaller than a first threshold value.

The list for a respective target image of a respective training target coating is then subdivided in a first sublist and a second sublist, wherein the first sublist comprises visually good matching formulas (i.e. the interrelated digital images are visually close to the respective digital images of the training target coating) of the plurality of preliminary matching formulas and the second sublist comprises visually bad matching formulas (i.e. the interrelated digital images are visually less close to the respective digital images of the training target coating) of the plurality of preliminary matching formulas. Then, a plurality of triplets is created, each triplet comprising the respective target image of the respective training target coating, a digital image of the first sublist and a digital image of the second sublist. For each target image images of the first sublist and the second sublist can be randomly combined and fused with the respective target image to form a triplet.

Models, i.e. neural networks were developed for both image similarity (complete image) and effect pigment similarity (images illustrating only effect pigments only with black background). The effect pigments were identified using image segmentation methods. Possible segmentation techniques include threshold methods, edge-based methods, clustering methods, histogram-based methods, neural network-based methods, hybrid methods, etc.

Using the first sublist $D_{i+}$ and the second sublist $D_{i-}$ for each training target coating, a plurality of triplets is created wherein each triplet comprises a digital image $d_i$ of the respective training target coating $C_i$ (with i being a natural integer number, i>0) for one of the at least one measurement geometry, a digital image $d_{i+}$ retrieved from the database for the one of the at least one measurement geometry which is interrelated with a visually good matching formula of the first sublist $D_{i+}$ and a digital image $d_{i-}$ retrieved from the database for the one of the at least one measurement geometry which is interrelated with a visually bad matching formula of the second sublist $D_{i-}$. An image similarity relationship is characterized by relative similarity ordering in the created triplets, i.e. the similarity relationship of the images is labelled with the created triplets. The created triplets $(d_i, d_{i+}, d_{i-})$ are fed into a convolutional neural network, i.e. the convolutional neural network takes the created triplets $(d_i, d_{i+}, d_{i-})$ as input. A triplet $(d_i, d_{i+}, d_{i-})$ characterizes a relative similarity ranking order for the respective included digital images $d_i, d_{i+}, d_{i-}$. It is an object to learn a n-dimensional embedding function $f$ that assigns a smaller distance F (in a n-dimensional parameter/feature space, with n being a natural integer number) to more similar image pairs, i.e. $F(f(d_i), f(d_{i+})) < F(f(d_i), f(d_{i-}))$ for all available training target coatings That means that a n-dimensional cost function F which defines a similarity distance to the at least one training target coating (by considering all extractable features of the respective images, the measurable features and the hidden features) is to be optimized, such that the cost function F is minimized for the respective visually good matching formula(s) and maximized for the respective visually bad matching formula(s). It is to be understood that the n-dimensional embedding function $f$ maps each image $d_i$, $d_{i+}$, $d_{i-}$ to a respective point, i.e. a feature map, in a n-dimensional parameter/feature space Rn wherein each dimension represents one feature wherein each feature might be weighted by a respective factor, and F is the distance in this space. The smaller the distance F of two images is, the more similar the two images are. The goal of the proposed method is to learn an embedding function $f$ that assigns smaller distance F to more similar image pairs, i.e. to consider in such embedding function $f$ as many features as possible, measurable and hidden features that have an impact on the visual appearance. The deep neural network $f$ computes the embedding of an image $d_i$: $f(d_i) \in R^n$ where n is the dimension of the feature embedding.

According to the present invention, it is proposed to use a reverse image search algorithm with convolutional neural networks for deep learning to compare the similarity between two HDR effect coating images, i.e. two digital images interrelating with a target coating and a sample coating, respectively.

Convolutional neural networks have the following advantages over previously disclosed parametric methods for image classification:
1. Current industry standard color and effect parameters do not fully describe visual assessment;
2. Convolutional neural networks automatically and adaptively learn multiple levels of hidden image features and are not restricted to defined color and effect parameters;
3. Convolutional neural networks can continue learning from large and growing quantities of available formulation and measured data.

The convolution neural network is trained for calculating embedded image and effect pigment features of a target coating and implemented in search/retrieval algorithm based off similarity measure.

The trained neural network $f$ is finally made available in the processor for ranking a digital image of a coating composition (i.e. a sample coating) with respect to a digital image of a target coating.

According to one embodiment of the proposed method, the method comprises in step e. a further step ee. which is executed for at least one triplet of the created triplets: rotating the digital image of the respective training target coating about the central image rotation axis by a given angle, rotating the digital image retrieved from the database which is interrelated with the respective visually good matching formula about the central image rotation axis by the given angle and rotating the digital image retrieved from the database which is interrelated with the respective visually bad matching formula about the central image rotation axis by the given angle, whereby for the respective training target coating and on the basis of the at least one triplet correspondingly at least one further triplet is obtained.

According to still a further embodiment, step ee. is repeated several times by changing the given angle.

Thereby, the given angle is chosen from the group comprising: 0°, 30°, 60°, 90°, 120°, 150°, 180°, 210°, 240°, 270°, 300°.

According to another embodiment of the proposed method, the method comprises in step e. a further step ee. which is executed for at least one triplet of the created triplets: dividing the digital image of the respective training target coating into a number of patches, dividing the digital image retrieved from the database which is interrelated with the respective visually good matching formula into the same number of corresponding patches and dividing the digital image retrieved from the database which is interrelated with the respective visually bad matching formula into the same number of corresponding patches, whereby for the respective training target coating and on the basis of the at least one triplet correspondingly further triplets corresponding to the number of patches are obtained.

According to still a further embodiment of the proposed method, step f. comprises setting-up the n-dimensional cost function F for training the convolutional neural network such that a n-dimensional embedding $f$ applied to a digital image b of a respective preliminary matching formula which can be represented by a corresponding vector $f(b)$ and which is defined by n parameters $a_i$ with $0 \leq i \leq n$, is mapped to a scalar s(b) (i.e. a distance value), each component $f_i$ (i.e. each dimension) of the vector $f(b)$ comprising a value of a feature of the respective preliminary matching formula wherein each parameter $a_i$ defines a weight for the respective feature.

According to another aspect, in step e. the digital images are pre-processed using image segmentation methods for identifying effect pigments and the digital images image the effect pigments only with black background.

The present disclosure also refers to a computer-implemented method, the method comprising at least the following steps:
A. obtaining, using at least one measuring device, color values, digital images and optionally texture values of a target coating for at least one measurement geometry,
B. providing a database which comprises formulas for coating compositions and interrelated color values (e.g. spectral data), interrelated digital images (e.g. HDR images) and optionally interrelated texture values (e.g. graininess, granularity, sparkle intensity, sparkle area, . . . ) for the at least one measurement geometry,
C. providing a computer with a trained convolutional neural network,
D. selecting from the database, one or more preliminary matching formulas based on the color values and optionally the texture values obtained for the target coating for the at least one measurement geometry,
E. retrieving from the database, for each of the one or more preliminary matching formulas and for the at least one measurement geometry, a digital image interrelated with the respective preliminary matching formula,
F. providing (inputting), for each of the one or more preliminary matching formulas, the respective retrieved digital image interrelated with the respective preliminary matching formula together with a digital image obtained for the target coating and for the at least one measurement geometry, to (into) the trained convolutional neural network,
G. determining, for each of the one or more preliminary matching formulas, a similarity distance between the target coating and the respective preliminary matching formula using the trained neural network which is trained to calculate the similarity distance in an embedded feature layer between the two digital images, namely, the respective retrieved digital image interrelated with the respective preliminary matching formula and the digital image obtained for the target coating, and
H. outputting, using an output device which is in operative connection with the computer, the determined similarity distances for the one or more preliminary matching formulas to a user.

According to one aspect, the method further comprises displaying the determined similarity distances for the one or more preliminary matching formulas on a display interface of a display monitor which is in communicative connection with the computer.

According to a further embodiment of the proposed method, the determined similarity distances for the one or more preliminary matching formulas are displayed in form of a ranking list wherein the lower the similarity distance is the better is the match of the respective preliminary matching formula with the target coating. The preliminary matching formula with the lowest similarity distance is placed on the top of the ranking list.

The present disclosure also refers to a computer-implemented method for ranking a similarity between a digital image of a sample coating and a digital image of a target coating using a computer with a trained convolutional neural network, the trained convolutional neural network being trained to calculate a similarity distance in an embedded feature layer of the trained convolutional neural network between the two digital images.

The trained convolutional neural network is provided, i.e. trained as described herein.

The present disclosure also refers to a device, comprising at least:
- a database, which comprises formulas for coating compositions and interrelated color values, interrelated digital images, and optionally interrelated texture values for at least one measurement geometry,
- at least one processor, which is in communicative connection with at least one measuring device, the database, and a convolutional neural network, and programmed to execute at least the following steps:
  1. receiving, from the at least one measuring device, color values, at least one digital image and optionally texture values of a target coating, and
  2. executing the steps c. to g. of the above mentioned method for training the convolution neural network and/or the steps D. to H. of the above mentioned method for using the trained neural network.

The convolutional neural network may be implemented on the at least one processor or it may be installed on a separate computing device which is in communicative connection with the at least one processor. The terms "computer", "processor" and "computing device" are used synonymously.

The present disclosure further refers to a non-transitory computer readable medium with a computer program with program codes that are configured, when the computer program is loaded and executed by at least one processor which is in a respective communicative connection with at least one measuring device which is configured to provide for each of at least one measurement geometry color values, digital images and optionally texture values of at least one target coating, with a database which comprises formulas for coating compositions and interrelated color values, interrelated digital images and optionally interrelated texture values for the at least one measurement geometry, and with a convolutional neural network, to execute at least the following steps:
  1. receiving, from the measuring device, color values, digital images and optionally texture values of at least one target coating for at least one measurement geometry, and
  2. executing the steps c. to g. of the above mentioned method for training the convolution neural network and/or the steps D. to H. of the above mentioned method for using the trained neural network.

The proposed method can be performed in addition, particularly subsequently to further pigment identification methods using a sparkle color distribution and/or a sparkle size distribution. Such methods are described, for example, in US 2017/0200288 A1 and the European Application with application number 19154898.1. The content of the last one is completely included herein by reference.

Finally, the best matching formula(s) is (are) identified (e.g. at the top of the ranking list) and forwarded to a mixing unit which is configured to produce/mix a paint/coating composition based on the identified best matching formula. The mixing unit produces such paint/coating composition which can then be used in place of the target coating. The mixing unit may be a component of the proposed device.

The convolutional neural network which can be used with the proposed method is based on a learning process referred to as backpropagation. The neurons of the convolutional neural network are arranged in layers. These layers include a layer with input neurons (input layer), a layer with output neurons (output layer), and one or more inner layers. Downstream of the neural network is a ranking layer which outputs respective similarity distances (similarity differences) which are to be determined/predicted for respective sample coatings with respect to the target coating. The convolutional neural network used is based on a learning process referred to as backpropagation. Backpropagation should be understood here as a generic term for a supervised learning process via error feedback. There are a variety of backpropagation algorithms: e. g. Quickprop, Resilient Propagation (RPROP). This process uses a neural network comprising at least three layers: a first layer with input neurons, an nth layer with output neurons, and (n−2) inner layers, where n is a natural number greater than 2. The terms "convolutional neural network" and "neural network" are used synonymously herein.

Input neurons used for the neural network in the training phase as training data are triplets of images of sample coatings and a training target coating, each sample coating being based on a formulation which has previously been identified out of the database as a preliminary matching formula with respect to the training target coating. Each triplet contains a target image $d_i$ of the training target coating, a positive image $d_{i+}$ of a preliminary (visually) good matching formula, and a negative image $d_{i-}$ of a preliminary (visually) bad matching formula. A triplet $(d_i, d_{i+}, d_{i-})$ characterizes the relative similarity relationship for the three images.

The inner layers of the convolutional neural network consist of all or a subset of convolutional layers, max pooling layers, local normalization layers and fully connected dense layers. The convolutional layer takes an image or feature maps of another layer as input, convolves it with a set of p learnable kernels, and puts through an activation function to generate p feature maps. The convolutional layer can be considered as a set of local feature detectors. The max pooling layer is responsible for reducing the dimensionality of the features from the convolution. The local normalization layer normalizes the feature map around a local neighbourhood to have unit norm and zero mean. It leads to feature maps that are robust to the differences in illumination and contrast. The stacked convolutional layers, max-pooling layer and local normalization layers act as translational and contrast robust local feature detectors. The dense layer is a standard fully-connected set of neurons in a neural network that maps the feature maps from convolutional and max pooling layers onto a point in a n-dimensional feature space, the point being gained by a n-dimensional embedding function $f$ defined by the neural network and applied to a digital image of a sample coating. A similarity distance value with respect to a target coating, i.e. a value of the cost function F, is a distance between two points in the n-dimensional feature space, namely the point assigned to the target coating and the point assigned to a respective sample coating.

The wording "formulas for coating compositions and associated images" means formulas for coating compositions and images which have been captured of the respective coatings. The wording "images associated with the one or more preliminary matching formulas" means images which have been captured of respective coatings (applied onto a substrate) of the one or more preliminary matching formulas, respectively.

The proposed device may comprise an output unit which is configured to output the determined similarity distances.

The proposed device is particularly configured to execute an embodiment of the above described methods.

Generally, at least the database (also called formulation database) and the at least one processor are networked among each other via respective communicative connections. In the case that the at least one measuring device and the convolutional neural network are separate components (i. e. not implemented on the at least one processor), whether internal components of the device or whether external components, the database and the at least one processor are also networked with those components via respective communicative connections, i. e. they are in communication with each other. Each of the communicative connections between the different components may be a direct connection or an indirect connection, respectively. Each communicative connection may be a wired or a wireless connection. Each suitable communication technology may be used. The formulation database, the at least one processor, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The processor may include or may be in communication with one or more input devices, such as a touch screen, an audio input, a movement input, a mouse, a keypad input and/or the like. Further the processor may include or may be in communication with one or more output devices, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the processor described herein and related components may be a portion of a local computer system or a remote computer or an online system or a combination thereof. The formulation database and software described herein may be stored in computer internal memory or in a non-transitory computer readable medium.

Within the scope of the present disclosure the database may be part of a data storage unit or may represent a data storage unit itself. The terms "database" and "data storage unit" are used synonymously.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

DETAILED DESCRIPTION OF THE DRAWINGS

Figure 1:
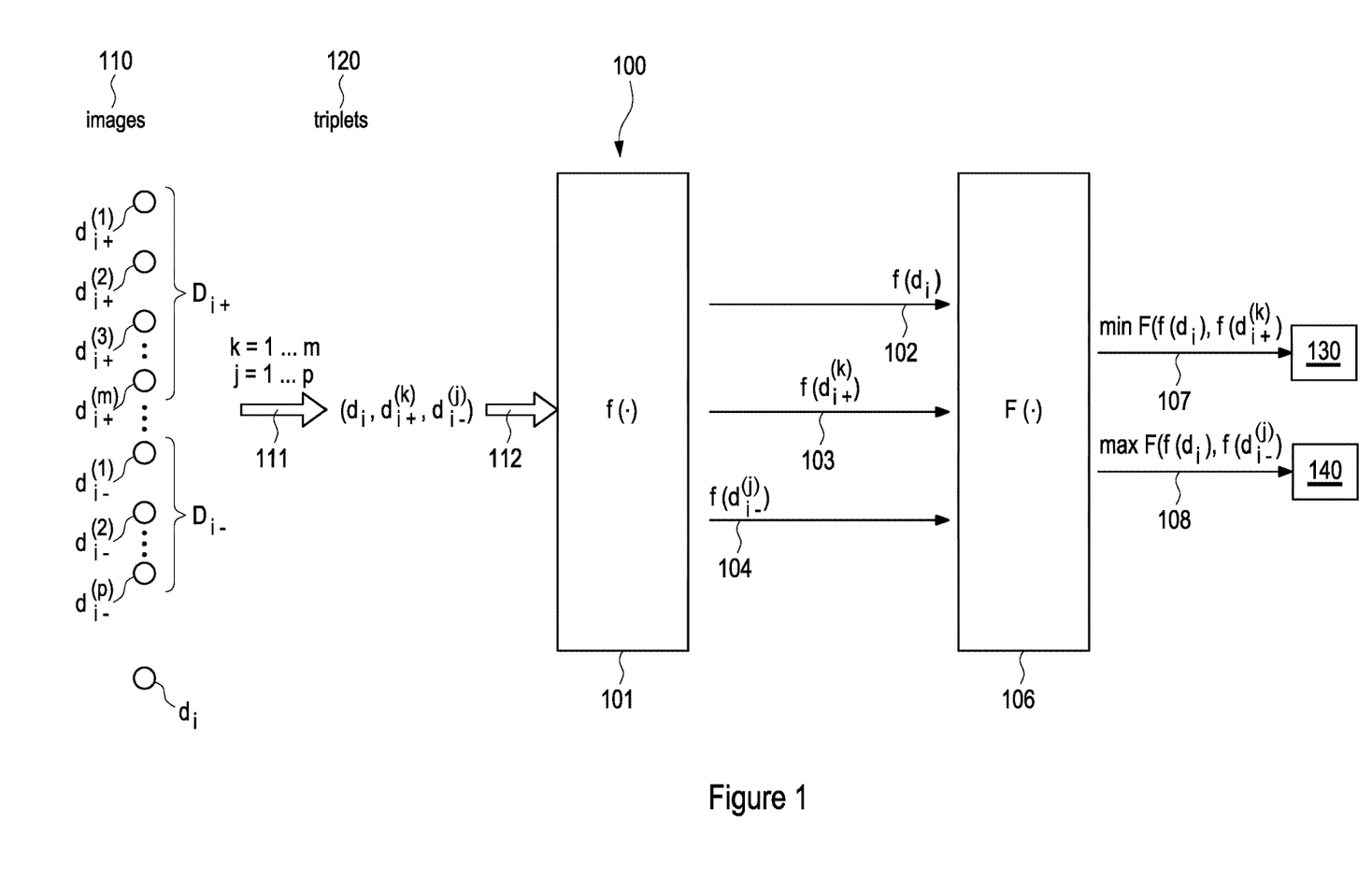
FIG. 1 schematically illustrates a flow diagram of an embodiment of the proposed method for training a neural network.

FIG. 1 schematically illustrates a flow diagram of an embodiment of the proposed method for training a neural network 100.

After retrieving, for each training target coating $C_i$, with $1 \leq i \leq l$, from a formulation database a list of a plurality of preliminary matching formulas based on color values and/or texture values obtained for the respective training target coating, the list of the plurality of preliminary matching formulas for the respective training target coating is divided into two sublists $D_{i+}$, $D_{i-}$ using visual inspection of a digital image $d_i$ of the respective training target coating, and digital images $d_{i+}^{(k)}$, $d_{i-}^{(j)}$, with $1 \leq k \leq m$, $1 \leq j \leq p$ which are interrelated with the preliminary matching formulas and retrieved from the database, wherein a first sublist $D_{i+}$ comprises visually good matching formulas of the plurality of preliminary matching formulas and a second sublist $D_{i-}$ comprises visually bad matching formulas of the plurality of preliminary matching formulas with respect to the respective training target coating.

According to one aspect, 500 to 1000, particularly 1000 different training target coatings $C_i$, i.e. $500 \leq i \leq 1000$ are chosen and, for each training target coating $C_i$, a number N of preliminary matching formulas is selected, N being an integer and m+p=N. That means that the convolutional neural network 100 is trained with a target image set i of about 500 to 1000 panels. For each target image $d_i$ a list of a plurality N of preliminary matching formulas is retrieved from the formulation database. The list comprises, for example, 20 preliminary matching formulas, i.e. N=20. Generally, those 20 preliminary matching formulas are the twenty best matching formulas that have, considering the color values and optionally the texture values, an acceptable match and similar pigmentation to the respective training target coating. The plurality of preliminary matching formulas may be chosen such that for each preliminary matching formula a color based distance, such as dE and optionally a texture based distance, such as dS, dG, dSa, dSi, or a sum of color and texture based distances, such as Σ(dE, dS, dG, dSa, dSi), to the respective training target coating is smaller than a first threshold value.

The list for the respective training target coating $C_i$ with its respective target image $d_i$ is then subdivided in a first sublist $D_{i+}$ and a second sublist $D_{i-}$ wherein the first sublist $D_{i+}$ comprises m visually good matching formulas of the plurality of preliminary matching formulas, whose digital images 110 are designated as $d_{i+}^{(1)}, d_{i+}^{(2)}, d_{i+}^{(3)}, \ldots, d_{i+}^{(m)}$, and the second sublist $D_{i-}$ comprises p visually bad matching formulas of the plurality of preliminary matching formulas, whose digital images 110 are designated as $d_{i-}^{(1)}, d_{i-}^{(2)}, d_{i-}^{(3)}, \ldots, d_{i-}^{(p)}$. Then, a plurality of triplets 120 is created in a step 111, each triplet $(d_i, d_{i+}^{(k)}, d_{i-}^{(j)})$ with $1 \leq k \leq m$ and $1 \leq j \leq p$, comprising the respective target image $d_i$, a digital image $d_{i+}^{(k)}$ of the first sublist $D_{i+}$ and a digital image $d_{i-}^{(j)}$ of the second sublist $D_{i-}$. For each target image $d_i$ images $d_{i+}^{(1)}, d_{i+}^{(2)}, d_{i+}^{(3)}, \ldots, d_{i+}^{(m)}, d_{i-}^{(1)}, d_{i-}^{(2)},$ $d_{i-}^{(3)}, \ldots, d_{i-}^{(p)}$ of the first sublist $D_{i+}$ and the second sublist $D_{i-}$ can be randomly combined and fused with the respective target image $d_i$ to form a triplet $(d_i, d_{i+}^{(k)}, d_{i-}^{(j)})$ with $1 \leq k \leq m$ and $1 \leq j \leq p$. Preferably, the respective three digital images $d_i$, $d_{i+}^{(k)}, d_{i-}^{(j)}$ that are combined to a triplet, are captured using the same measurement geometry, respectively.

Models, i.e. neural networks were developed for both image similarity (complete image) and effect pigment similarity (effect pigments only with black background). The effect pigments were identified using image segmentation methods. Possible segmentation techniques include threshold methods, edge-based methods, clustering methods, histogram-based methods, neural network-based methods, hybrid methods, etc.

Using the first sublist $D_{i+}$ and the second sublist $D_{i-}$ for each training target coating $C_i$, a plurality of triplets $(d_i, d_{i+}^{(k)}, d_{i-}^{(j)})$ with $1 > k \leq m$ and $1 < j \leq p$ and $m, p > 1$ is created, as indicated by arrow 111, wherein each triplet $(d_i, d_{i+}^{(k)}, d_{i-}^{(j)})$ comprises a digital image $d_i$ of the respective training target coating $C_i$ (with i being a natural integer number, i>0) for one of the at least one measurement geometry, a digital image $d_{i+}^{(k)}$ retrieved from the database for the one of the at least one measurement geometry which is interrelated with a visually good matching formula of the first sublist $D_{i+}$ and a digital image $d_{i-}^{(j)}$ retrieved from the database for the one of the at least one measurement geometry which is interrelated with a visually bad matching formula of the second sublist $D_{i-}$. An visual image similarity relationship is characterized by relative similarity ordering in the created triplets, i.e. the similarity relationship of the images is labelled with the created triplets. The created triplets $(d_i, d_{i+}^{(k)}, d_{i-}^{(j)})$ are fed into the convolutional neural network 100, i.e. the convolutional neural network takes the created triplets $(d_i, d_{i+}^{(k)}, d_{i-}^{(j)})$ as input. Thereby, the triplets $(d_i, d_{i+}^{(k)}, d_{i-}^{(j)})$ are fed to the neural network 100 one after the other as indicated by arrow 112. That means that the running parameters k,j are increased successively with $k=1, \ldots, m$ and $j=1, \ldots, p$. A triplet $(d_i, d_{i+}^{(k)}, d_{i-}^{(j)})$ characterizes a relative similarity ranking order for the respective included digital images $d_i, d_{i+}^{(k)}, d_{i-}^{(j)}$.

It is an object to learn a n-dimensional embedding function $f$ 101, i.e. the neural network 100 that assigns a smaller distance defined by a similarity distance function F 106 (in a n-dimensional parameter/feature space $R^n$, with n being a natural integer number) to more similar image pairs, i.e. $F(f(d_i), f(d_{i+}^{(k)})) < F(f(d_i), f(d_{i-}^{(j)}))$ for all available training target coatings $C_i$. The n-dimensional embedding function $f$ 101 is realized by a group of network layers of the neural network 100. The distance function F 106 represents a cost function and is realized by a ranking layer as a final output layer of the neural network 100. The n-dimensional embedding function $f$ 101 first assigns each digital image $d_i$, $d_{i+}^{(k)}$, $d_{i-}^{(j)}$ of a respective triplet $(d_i, d_{i+}^{(k)}, d_{i-}^{(j)})$ 120 to exactly one point $f(d_i), f(d_{i+}^{(k)}), f(d_{i-}^{(j)})$, respectively, in the n-dimensional space $R^n$. That means that $d_i$ is assigned to $f(d_i)$ 102, $d_{i+}^{(k)}$ is assigned to $f(d_{i+}^{(k)})$ 103 and $d_{i-}^{(j)}$ is assigned to $f(d_{i-}^{(j)})$ 104 in the n-dimensional space $R^n$. A distance $F(f(d_i), f(d_{i+}^{(k)}))$ between the point $f(d_i)$ 102 assigned to the digital image $d_i$ of the respective training target coating $C_i$ and the point $f(d_i(d_{i+}^{(k)})$ 103 assigned to the digital image $d_{i+}^{(k)}$ of the respective preliminary good matching coating and/or a distance $F(f(d_i), f(d_{i-}^{(j)}))$ between the point $f(d_i)$ 102 assigned to the digital image $d_i$ of the respective training target coating $C_i$ and the point $f(d_{i-}^{(j)})$ 104 assigned to the digital image $d_{i-}^{(j)}$ of the respective preliminary bad matching coating is a measure of the similarity between the respective training target coating $C_i$ and the respective preliminary matching coating, respectively. This distance is defined by the n-dimensional cost function F 106.

That means that the n-dimensional cost function F 106 which defines a similarity distance to the at least one training target coating $C_i$ (by considering all extractable features of the respective images, the measurable features and the hidden features) is to be optimized, such that the cost function F 106 is minimized min $F(f(d_i), f(d_{i+}^{(k)}))$ for the respective visually good matching formula and maximized max $F(f(d_i), f(d_{i-}^{(j)}))$ for the respective visually bad matching formula. As already described above, it is to be understood that the n-dimensional embedding function $f$ 101 maps each image $d_i, d_{i+}^{(k)}, d_{i-}^{(j)}$ to a respective point $f(d_i)$, $f(d_{i+}^{(k)}), f(d_{i-}^{(j)})$ in the n-dimensional parameter space $R^n$ wherein each dimension represents one feature wherein each feature might be weighted by a respective factor:

$$d_i \xrightarrow{f} f(d_i)$$

$$d_{i+}^{(k)} \xrightarrow{f} f(d_{i+}^{(k)})$$

$$d_{i-}^{(j)} \xrightarrow{f} f(d_{i-}^{(j)})$$

F 106 represents the distance/distance metric in this space. The smaller the distance F 106 of two images is, the more similar the two images are. When training the neural network 100, the goal of the proposed method is to learn an embedding function $f$ 101 that assigns smaller distance F 106 to more similar image pairs, i.e. to consider in such embedding function $f$ 101 as many features as possible, measurable and hidden features that have an impact on the visual appearance. The layers $f$ 101 of the deep neural network 100 computes the embedding of an image $d_i$: $f(d_i) \in R^n$ where n is the dimension of the feature embedding.

When training the neural network 100, it is known that after passing through the neural network 100, all digital images of the first sublist $D_{i+}$ are to be assigned to a category 130 designating the visually good matching coatings, and all digital images of the second sublist $D_{i-}$ are to be assigned to a category 140 designating the visually bad matching coatings among the plurality of preliminary matching coatings. With this knowledge and by using, inter alia, the backpropagation concept, the cost function F 106 can be simultaneously minimized for the visually good matching coatings and maximized for the visually bad matching coatings. Accordingly, the embedding function $f$ 101 and its defining parameters is determined.

Figure 2:
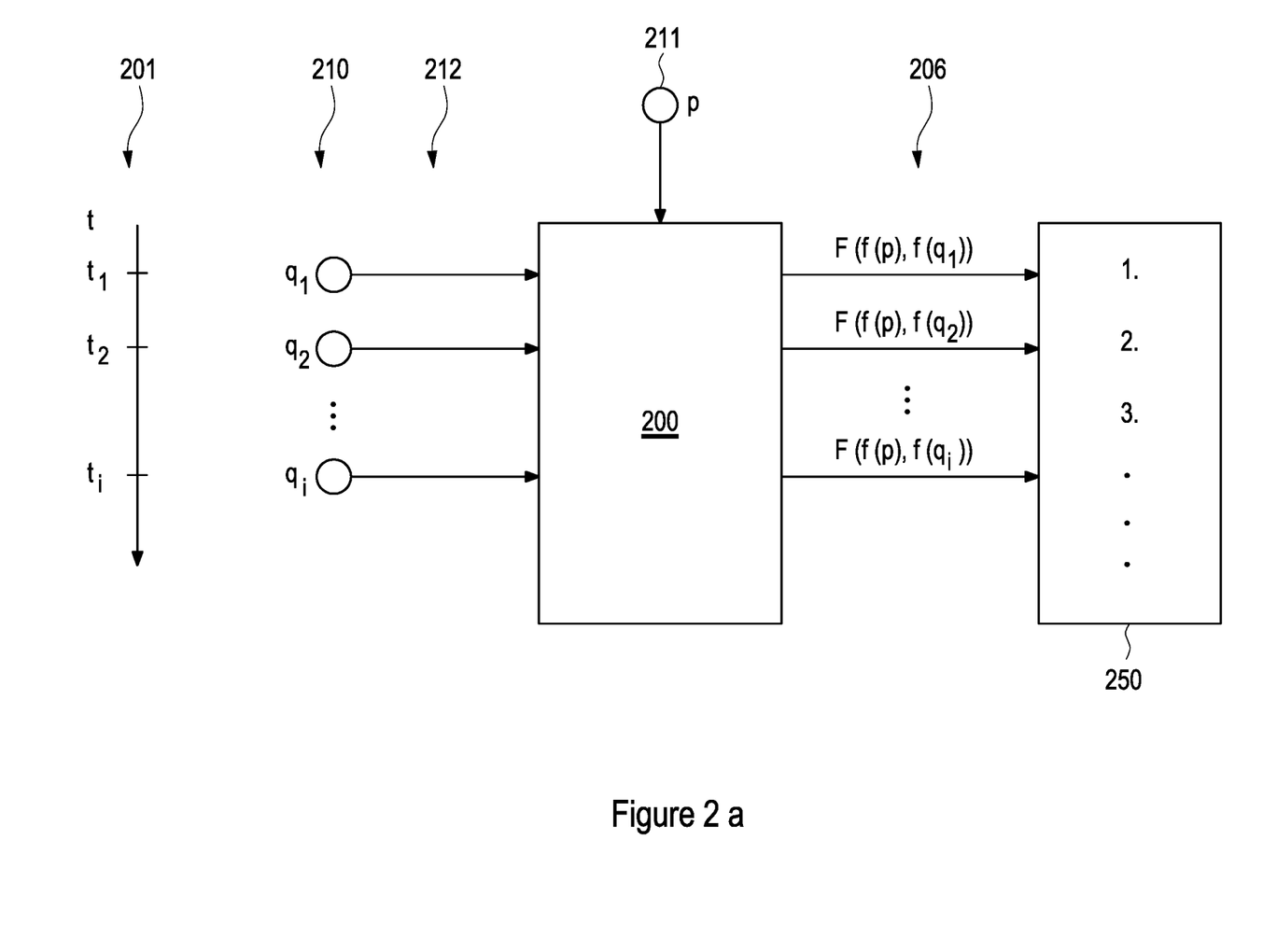
FIG. 2 schematically illustrates a flow diagram of an embodiment of the proposed method for using a trained neural network which has been trained according to an embodiment of the proposed training method.

When the embedding function $f$ 101 is determined, it is to be provided for usage as/in the trained neural network of the device 200 when searching for a good matching formula with regard to an available digital image p 211 of a target coating as schematically illustrated in FIG. 2.

The output 250 of the device 200 which implements the trained neural network 202, when passed by a digital image p 211 (=target image) of a target coating and by a respective digital image $q_1, q_2, \ldots, q_i$, with $i \geq 1$ of a respective sample coating to be analysed for similarity to the target coating, is a respective distance value $F(f(p), f(q_j))$ with $1 \leq j \leq i$ 206 (see FIG. 2a). When multiple digital images $q_1, q_2, \ldots, q_i$ 210 of corresponding multiple sample coatings to be analysed for similarity to the target coating are fed 212 one after the other, as indicated by the time scale 201, to the neural network 202 for evaluation, the neural network 202 applies the trained embedding function $f(\cdot)$ to each digital image and outputs for each digital image a respective point/feature map $f(p)$, $f(q_1)$, $f(q_2)$, ... $f(q_i)$ as indicated by arrows 203 (see FIG. 2b). The cost function $F(\cdot)$ 204 is applied to respective pairs of feature maps, each pair comprising the feature map assigned to the target image p and a feature map assigned to a digital image $q_j$ of the sample coatings. The respective distance value $F(f(p), f(q_j))$ with $1 \leq j \leq i$ 206 allows a ranking between the sample coatings to be analysed for similarity to the target coating. This ranking order 250 can be output or displayed in the form of a table (as indicated in FIGS. 2a and 2b), a list, a bar chart or similar.

Figure 3:
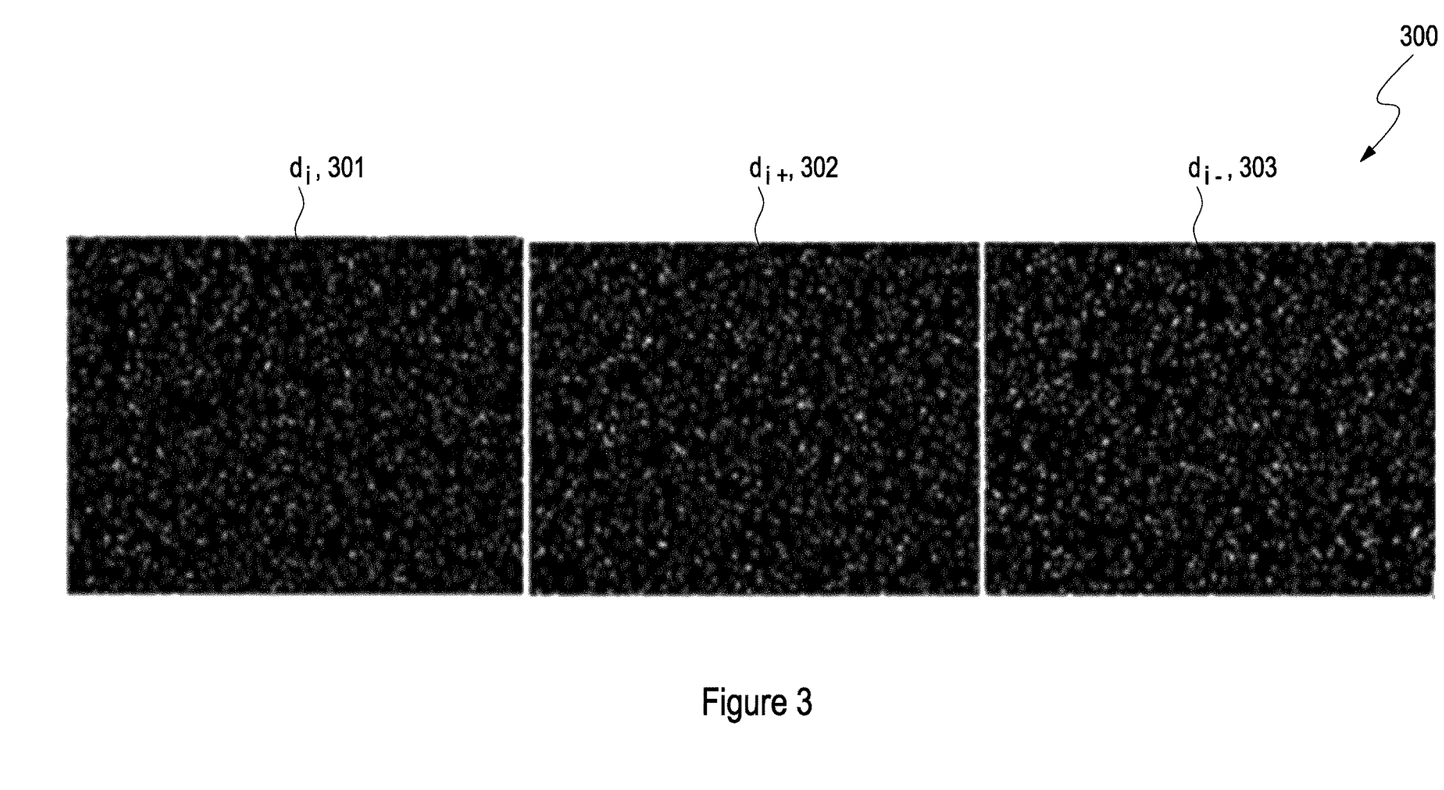
FIG. 3 shows a triplet of images for training a neural network according to an embodiment of the proposed training method.

FIG. 3 schematically illustrates a triplet $(d_i, d_{i+}, d_{i-})$ 300. Each triplet 300 contains a target image $d_i$, 301, a positive image $d_{i+}$ 302, and a negative image $d_{i-}$, 303. A triplet 300 characterizes the relative similarity relationship for the three images 301, 302, 303. Models, i.e. neural networks were developed for both image similarity (complete image) and effect pigment similarity (effect pigments only with black background). The effect pigments were identified using image segmentation methods. Possible segmentation techniques include threshold methods, edge-based methods, clustering methods, histogram-based methods, neural network-based methods, hybrid methods, etc.

Figure 4:
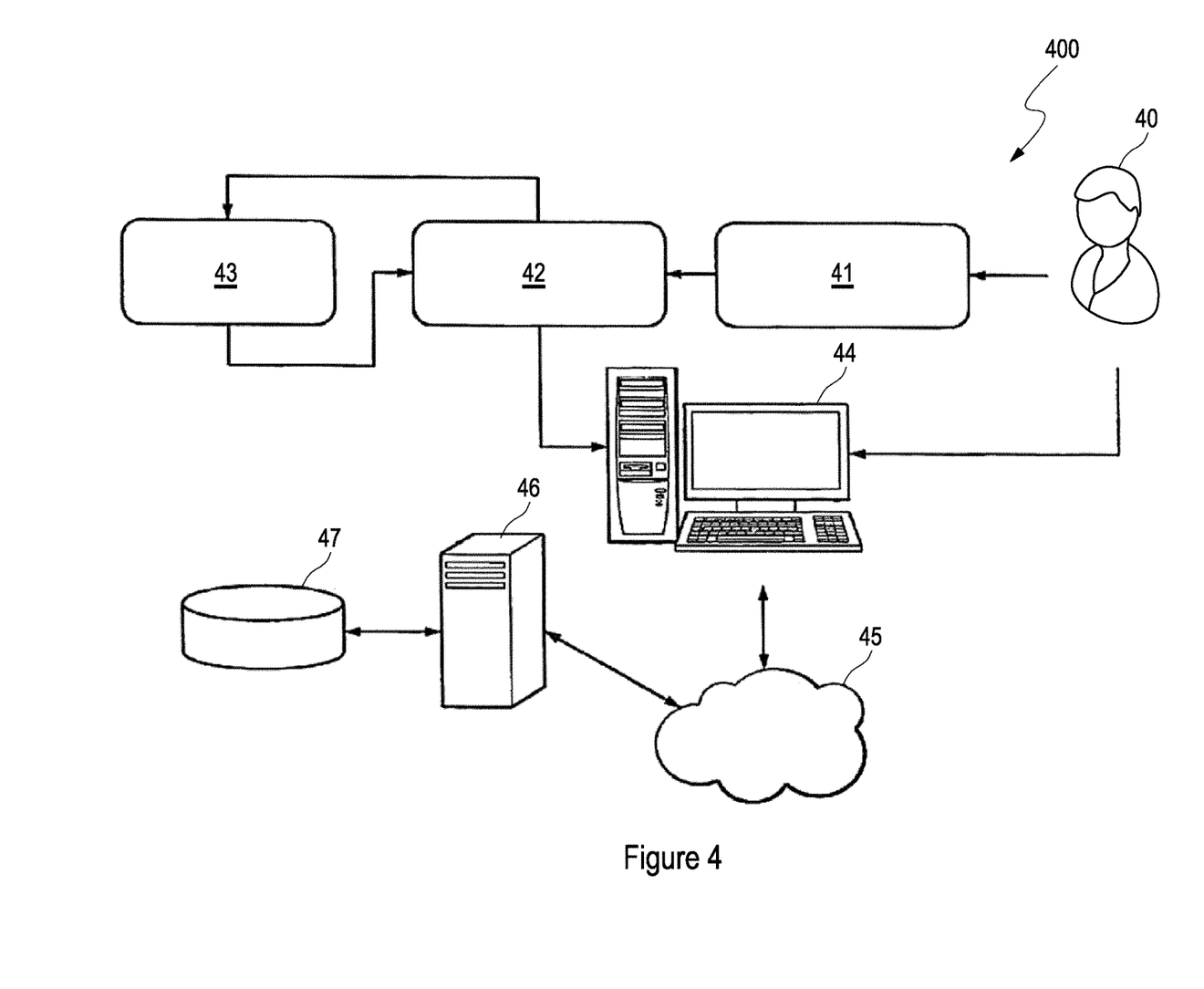
FIG. 4 schematically illustrates an embodiment of the proposed device.

FIG. 4 illustrates an embodiment of a device 400 which may be used to execute the methods described herein. A user 40 may utilize a user interface 41, such as a graphical user interface, to operate at least one measuring device 42 to measure the properties of a target coating 43, i. e. to capture digital images of the target coating by means of a camera, each image being obtained at a different measurement geometry, e. g. at a different angle, and to determine color values and optionally texture values for different spectral measurement geometries, using, for instance, a spectrophotometer. The data from the at least one measuring device, e. g the camera 42 may be transferred to a computer 44, such as a personal computer, a mobile device, or any type of processor. The computer 44 may be in communication, i. e. in a communicative connection, via a network 45, with a server 46. The network 45 may be any type of network, such as the Internet, a local area network, an intranet, or a wireless network. The server 46 is in communication with a database 47 that may store the data and information that are used by the methods of embodiments of the present invention for comparison purposes. In various embodiments, the database 47 may be utilized in, for example, a client server environment or in, for example, a web based environment such as a cloud computing environment.

Various steps of the methods of embodiments of the present invention may be performed by the computer 44 and/or the server 46. In another aspect, the invention may be implemented as a non-transitory computer readable medium containing software for causing a computer or computer system to perform the methods described above. The software can include various modules that are used to enable a processor and a user interface to perform the methods described herein.

LIST OF REFERENCE SIGNS 100 neural network
101 embedding function
102 $f(d_i)$
103 $f(d_{i+}^{(k)})$
104 $f(d_{i-}^{(j)})$
106 cost function F
107 min $F(f(d_i), f(d_{i+}^{(k)}))$
108 max $F(f(d_i), f(d_{i-}^{(j)}))$
110 images
111 arrow
112 arrow
120 triplets
130 category "Good"
140 category "Bad"
200 device with implemented trained neural network
201 time scale
202 the trained neural network
203 arrows
204 cost function $F(\cdot)$
210 digital images of sample coatings
211 digital image of target coating
212 feeding in the neural network
206 output of the neural network, distance values $F(f(p), f(q_j))$
250 ranking order, output of the neural network
301 $d_i$
302 $d_{i+}$
303 $d_{i-}$
400 device
40 user
41 user interface
42 measuring device
43 target coating
44 computer
45 network
46 server
47 database

The invention claimed is:

1. A computer-implemented method, the method comprising at least the following steps:
    (a) obtaining, using at least one measuring device, for each of at least one measurement geometry color values, digital images and optionally texture values of at least one training target coating,
    (b) providing a database which comprises formulas for coating compositions and, for each of the at least one measurement geometry, interrelated color values, interrelated digital images, and optionally interrelated texture values,
    (c) retrieving, using a processor, from the database, for each training target coating, a list of a plurality of preliminary matching formulas based on the color values and optionally on the texture values obtained for the respective training target coating,
    (d) dividing the list of the plurality of preliminary matching formulas into two sublists using visual inspection of the digital images of the at least one training target coating and the digital images interrelated with the preliminary matching formulas and retrieved from the database, wherein a first sublist comprises visually good matching formulas of the plurality of preliminary matching formulas and a second sublist comprises visually bad matching formulas of the plurality of preliminary matching formulas,
    (e) creating, using the processor, for each training target coating, a plurality of triplets, each triplet comprising a digital image of the respective training target coating for one of the at least one measurement geometry, a digital image retrieved from the database for the one of the at least one measurement geometry which is interrelated with a visually good matching formula of the first sublist and a digital image retrieved from the database for the one of the at least one measurement geometry which is interrelated with a visually bad matching formula of the second sublist, (f) training a convolutional neural network by providing the created triplets, one triplet after the other, to the convolutional neural network as a respective input, and optimizing a n-dimensional cost function, the cost function defining a similarity distance to the at least one training target coating, such that the cost function is minimized for the respective visually good matching formula and maximized for the respective visually bad matching formula, and (g) making the trained neural network available in the processor for ranking of a digital image of a coating composition with respect to a digital image of a target coating.

2. The method according to claim 1, further comprising in step (e) a further step (ee) which is executed for at least one triplet of the created triplets: rotating the digital image of the respective training target coating about the central image rotation axis by a given angle, rotating the digital image retrieved from the database which is interrelated with the respective visually good matching formula about the central image rotation axis by the given angle and rotating the digital image retrieved from the database which is interrelated with the respective visually bad matching formula about the central image rotation axis by the given angle, whereby for the respective training target coating and on the basis of the at least one triplet correspondingly at least one further triplet is obtained.

3. The method according to claim 2, comprising repeating step (ee) several times by changing the given angle.

4. The method according to claim 2, wherein the given angle is selected from the group consisting of: 0°, 30°, 60°, 90°, 120°, 150°, 180°, 210°, 240°, 270°, and 300°.

5. The method according to claim 1, further comprising in step (e) a further step (ee) which is executed for at least one triplet of the created triplets: dividing the digital image of the respective training target coating into a number of patches, dividing the digital image retrieved from the database which is interrelated with the respective visually good matching formula into the same number of corresponding patches and dividing the digital image retrieved from the database which is interrelated with the respective visually bad matching formula into the same number of corresponding patches, whereby for the respective training target coating and on the basis of the at least one triplet correspondingly further triplets corresponding to the number of patches are obtained.

6. The method according to claim 1, wherein step (f) comprises setting-up the n-dimensional cost function F for training the convolutional neural network such that a n-dimensional embedding function $f$ which can be represented by a corresponding vector and which is defined by n parameters $a_i$ with $0 \leq i \leq n$, is mapped to a scalar s, each component $f_i$ of the vector $f$ comprising a value of a feature of the respective preliminary matching formula wherein each parameter $a_i$ defines a weight for the respective feature.

7. The method according to claim 1, wherein in step (e) the digital images are pre-processed using image segmentation methods for identifying effect pigments and the digital images imaging the effect pigments are used only with black background.

8. The method according to claim 1, wherein 500 to 1000 different training target coatings are chosen and, for each training target coating, a number N of preliminary matching formulas is selected, N being an integer.

9. The method according to claim 1, wherein the plurality of preliminary matching formulas is chosen such that for each preliminary matching formula a color based distance, optionally a texture based distance or a color and texture based distance to the respective training target coating is smaller than a first threshold value.

10. A device, comprising at least:
a database, which comprises formulas for coating compositions and interrelated color values, interrelated digital images and optionally interrelated texture values for at least one measurement geometry,
at least one processor, which is in communicative connection with at least one measuring device, the database, and a convolutional neural network, and programmed to execute at least the following steps:
(1) receiving, from the at least one measuring device, color values, digital images and optionally texture values of a target coating, and
(2) executing the steps (a) to (g) of claim 1.

11. A non-transitory computer readable medium with a computer program with program codes that are configured, when the computer program is loaded and executed by at least one processor which is in a respective communicative connection with at least one measuring device which is configured to provide for each of at least one measurement geometry color values, digital images and optionally texture values of at least one target coating, with a database which comprises formulas for coating compositions and interrelated color values, interrelated digital images and optionally interrelated texture values for the at least one measurement geometry, and with a convolutional neural network, to execute at least the following steps:
(1) receiving, from the measuring device, color values, digital images and optionally texture values of at least one target coating for at least one measurement geometry, and
(2) executing the steps (a) to (g) of claim 1.

12. The method according to claim 1, wherein 1000 different training target coatings are chosen and, for each training target coating, a number N of preliminary matching formulas is selected, N being an integer.

13. A computer-implemented method, the method comprising at least the following steps:
(A) obtaining, using at least one measuring device, color values, digital images and optionally texture values of a target coating for at least one measurement geometry,
(B) providing a database which comprises formulas for coating compositions and interrelated color values, interrelated digital images and optionally interrelated texture values for the at least one measurement geometry,
(C) providing a computer with a trained convolutional neural network,
(D) selecting from the database, one or more preliminary matching formulas based on the color values and optionally on the texture values obtained for the target coating for the at least one measurement geometry,
(E) retrieving from the database, for each of the one or more preliminary matching formulas and for the at least one measurement geometry, a digital image interrelated with the respective preliminary matching formula,
(F) providing, for each of the one or more preliminary matching formulas, the respective retrieved digital image interrelated with the respective preliminary matching formula together with a digital image obtained for the target coating and for the at least one measurement geometry, to the trained convolutional neural network,
(G) determining, for each of the one or more preliminary matching formulas, a similarity distance between the target coating and the respective preliminary matching formula using the trained neural network which is trained to calculate a similarity distance in an embedded feature layer between the two digital images, namely, the respective retrieved digital image interrelated with the respective preliminary matching formula and the digital image obtained for the target coating, and (H) outputting, using an output device which is in operative conjunction with the computer, the determined similarity distances for the one or more preliminary matching formulas to a user;

wherein the trained convolutional neural network has been trained according to a training method comprising at least the following steps:

(a) obtaining, using at least one measuring device, for each of at least one measurement geometry color values, digital images and optionally texture values of at least one training target coating, (b) providing a database which comprises formulas for coating compositions and, for each of the at least one measurement geometry, interrelated color values, interrelated digital images, and optionally interrelated texture values, (c) retrieving, using a processor, from the database, for each training target coating, a list of a plurality of preliminary matching formulas based on the color values and optionally on the texture values obtained for the respective training target coating, (d) dividing the list of the plurality of preliminary matching formulas into two sublists using visual inspection of the digital images of the at least one training target coating and the digital images interrelated with the preliminary matching formulas and retrieved from the database, wherein a first sublist comprises visually good matching formulas of the plurality of preliminary matching formulas and a second sublist comprises visually bad matching formulas of the plurality of preliminary matching formulas, (e) creating, using the processor, for each training target coating, a plurality of triplets, each triplet comprising a digital image of the respective training target coating for one of the at least one measurement geometry, a digital image retrieved from the database for the one of the at least one measurement geometry which is interrelated with a visually good matching formula of the first sublist and a digital image retrieved from the database for the one of the at least one measurement geometry which is interrelated with a visually bad matching formula of the second sublist, (f) training a convolutional neural network by providing the created triplets, one triplet after the other, to the convolutional neural network as a respective input, and optimizing a n-dimensional cost function, the cost function defining a similarity distance to the at least one training target coating, such that the cost function is minimized for the respective visually good matching formula and maximized for the respective visually bad matching formula, and (g) making the trained neural network available in the processor for ranking of a digital image of a coating composition with respect to a digital image of a target coating.

14. The method according to claim 13 comprising displaying the determined similarity distances for the one or more preliminary matching formulas on a display interface of a display monitor in communicative connection with the computer.

15. The method according to claim 14, wherein the determined similarity distances for the one or more preliminary matching formulas are displayed in form of a ranking list wherein the lower the similarity distance is the better is the match of the respective preliminary matching formula with the target coating.

16. A device, comprising at least:
a database, which comprises formulas for coating compositions and interrelated color values, interrelated digital images and optionally interrelated texture values for at least one measurement geometry,
at least one processor, which is in communicative connection with at least one measuring device, the database, and a convolutional neural network, and programmed to execute at least the following steps:
(1) receiving, from the at least one measuring device, color values, digital images and optionally texture values of a target coating, and
(2) executing the steps (A) to (H) of claim 13.

17. A non-transitory computer readable medium with a computer program with program codes that are configured, when the computer program is loaded and executed by at least one processor which is in a respective communicative connection with at least one measuring device which is configured to provide for each of at least one measurement geometry color values, digital images and optionally texture values of at least one target coating, with a database which comprises formulas for coating compositions and interrelated color values, interrelated digital images and optionally interrelated texture values for the at least one measurement geometry, and with a convolutional neural network, to execute at least the following steps:
(1) receiving, from the measuring device, color values, digital images and optionally texture values of at least one target coating for at least one measurement geometry, and
(2) executing the steps (A) to (H) of claim 13.

18. A computer-implemented method for ranking a similarity between a digital image of a sample coating and a digital image of a target coating using a computer with a trained convolutional neural network, the trained convolutional neural network being trained to calculate a similarity distance in an embedded feature layer of the trained convolutional neural network between the two digital images;

wherein the trained convolutional neural network has been trained according to a training method comprising at least the following steps:

(a) obtaining, using at least one measuring device, for each of at least one measurement geometry color values, digital images and optionally texture values of at least one training target coating, (b) providing a database which comprises formulas for coating compositions and, for each of the at least one measurement geometry, interrelated color values, interrelated digital images, and optionally interrelated texture values, (c) retrieving, using a processor, from the database, for each training target coating, a list of a plurality of preliminary matching formulas based on the color values and optionally on the texture values obtained for the respective training target coating, (d) dividing the list of the plurality of preliminary matching formulas into two sublists using visual inspection of the digital images of the at least one training target coating and the digital images interrelated with the preliminary matching formulas and retrieved from the database, wherein a first sublist comprises visually good matching formulas of the plurality of preliminary matching formulas and a second sublist comprises visually bad matching formulas of the plurality of preliminary matching formulas, (e) creating, using the processor, for each training target coating, a plurality of triplets, each triplet comprising a digital image of the respective training target coating for one of the at least one measurement geometry, a digital image retrieved from the database for the one of the at least one measurement geometry which is interrelated with a visually good matching formula of the first sublist and a digital image retrieved from the database for the one of the at least one measurement geometry which is interrelated with a visually bad matching formula of the second sublist, (f) training a convolutional neural network by providing the created triplets, one triplet after the other, to the convolutional neural network as a respective input, and optimizing a n-dimensional cost function, the cost function defining a similarity distance to the at least one training target coating, such that the cost function is minimized for the respective visually good matching formula and maximized for the respective visually bad matching formula, and (g) making the trained neural network available in the processor for ranking of a digital image of a coating composition with respect to a digital image of a target coating.

* * * * *